Figure 1:
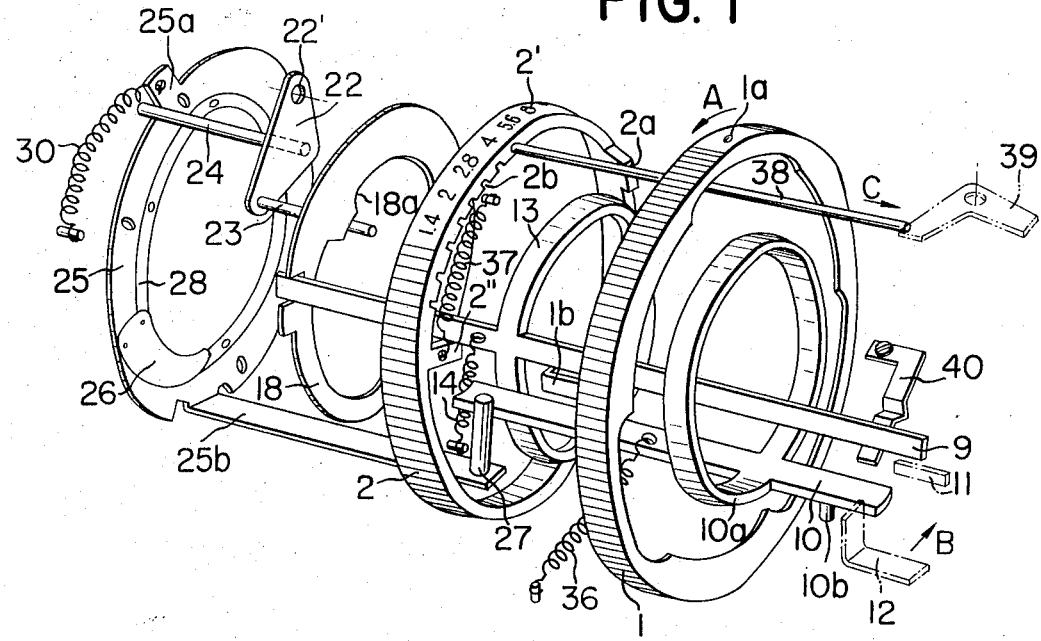

United States Patent [19]
Hasegawa et al.

[11] 3,858,225
[45] Dec. 31, 1974

[54] INTERCHANGE LENS ATTACHMENT FOR SINGLE LENS REFLEX CAMERA

[75] Inventors: Goro Hasegawa, Tokyo; Masaharu Ito, Kawasaki, both of Japan

[73] Assignee: Canon Kabushiki Kaisha, Tokyo, Japan

[22] Filed: Dec. 20, 1972

[21] Appl. No.: 317,353

Related U.S. Application Data
[63] Continuation of Ser. No. 98,550, Dec. 16, 1970, abandoned.

[30] Foreign Application Priority Data
Dec. 19, 1969  Japan............................ 44-120477
Dec. 19, 1969  Japan............................ 44-120478
Feb. 16, 1970  Japan............................ 45-15011
Feb. 14, 1970  Japan............................ 45-14410
Jan. 12, 1970  Japan............................ 45-3381

[52] U.S. Cl. ................................. 354/46, 354/286
[51] Int. Cl. ............................................ G03b 7/00
[58] Field of Search ......... 95/10 C, 42, 64 R, 64 B; 354/40, 46, 47, 41, 42, 45, 286

[56] References Cited
UNITED STATES PATENTS
3,013,478  12/1961  Gebele ............................ 95/10 C
3,110,236  11/1963  Singer ............................. 95/10 C
3,129,647   4/1964  Koppen et al. ................... 95/10 C
3,485,153  12/1969  Ono et al. ......................... 95/42 X
3,517,594   6/1970  Kitai ................................. 354/47
3,578,765   5/1971  Kobayashi ........................ 95/10 C
3,672,287   6/1972  Muryor ............................ 354/45 X Primary Examiner—Samuel S. Matthews
Assistant Examiner—E. M. O'Connor
Attorney, Agent, or Firm—Toren and McGeady

[57] ABSTRACT

In the lens mount for a TTL reflex camera disclosed a transmission member rotates a cam ring as an operator attempts to align a pointer with an exposure meter needle. The can ring determines the stop position of a diaphragm blade driving ring. The transmission member also rotates the casing to align the needle with the pointer. When the lens is mounted on a camera having an electric eye mechanism where an indicator member responds to the meter reading, the indicator member drives the transmission member. The latter rotates the cam ring to preset the diaphragm.

14 Claims, 11 Drawing Figures

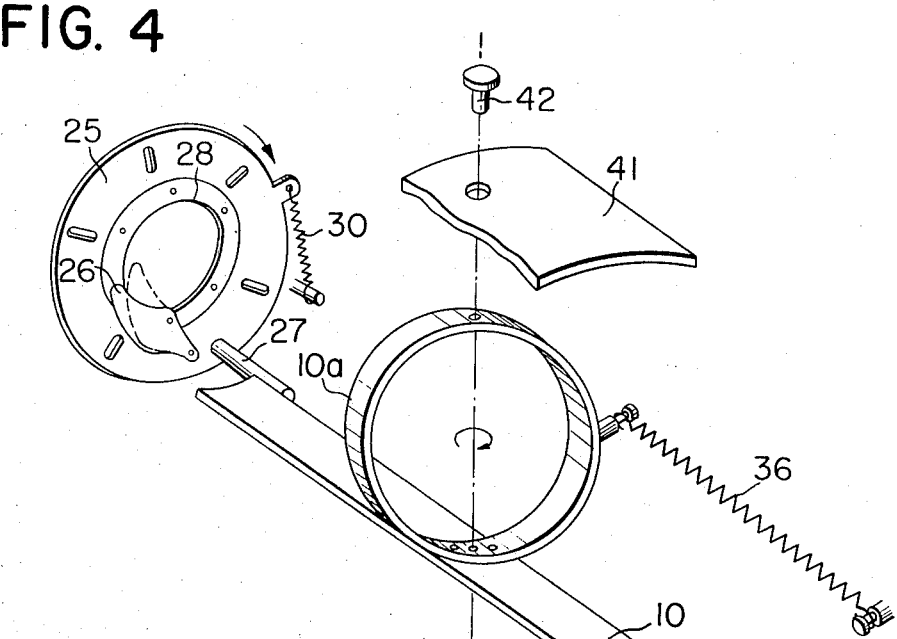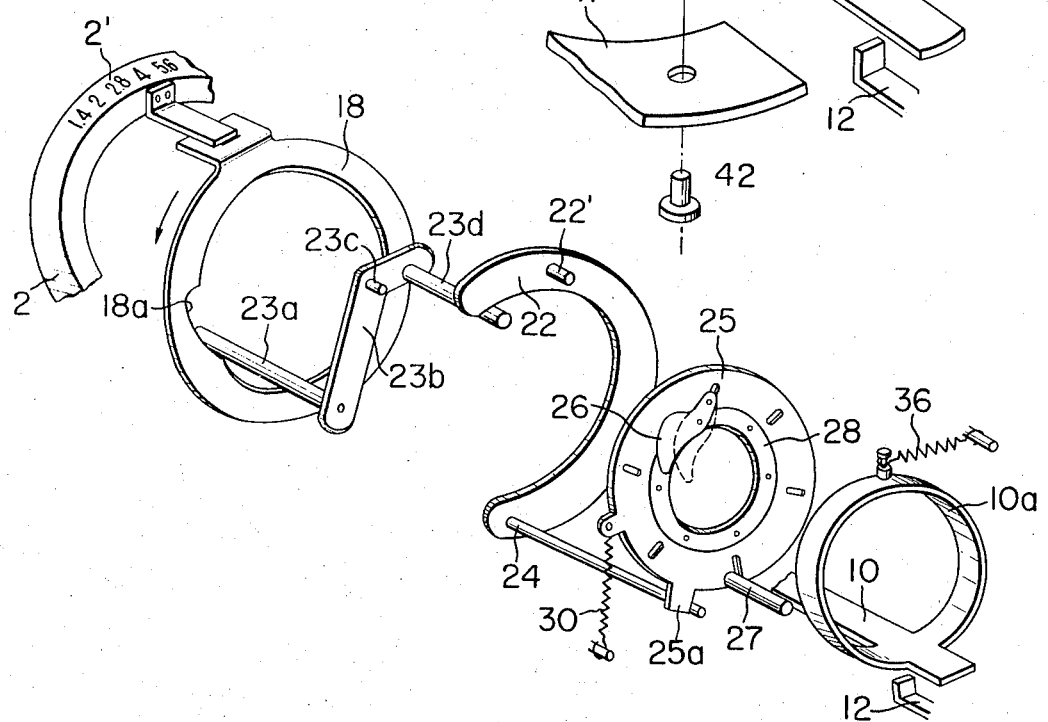

FIG. 6
FIG. 7
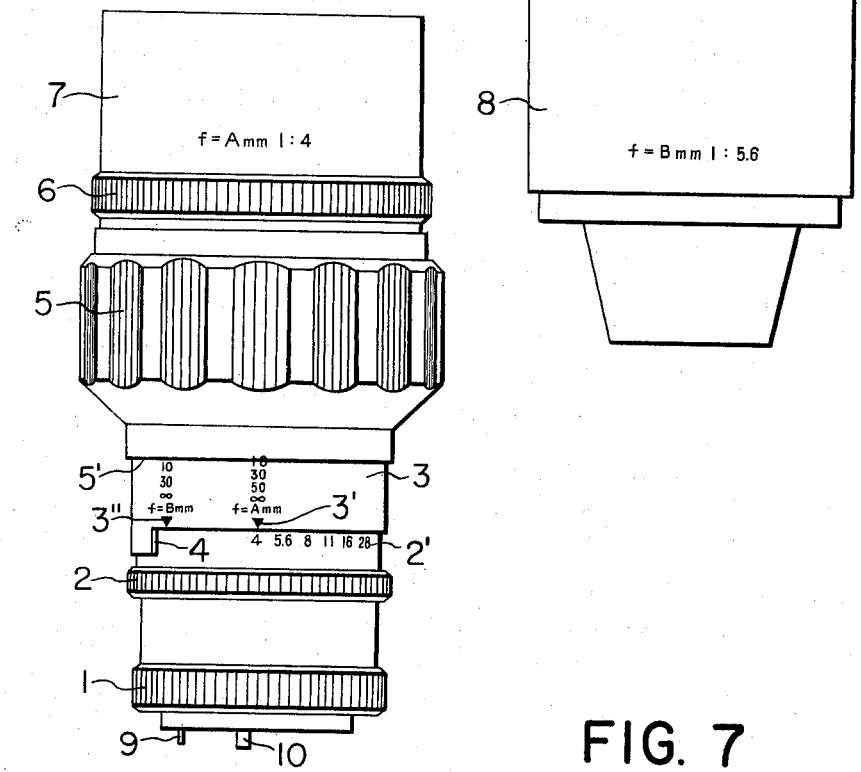
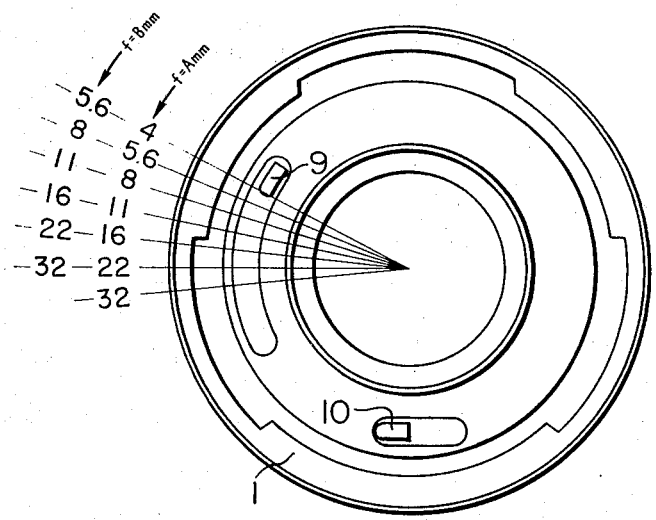

INTERCHANGE LENS ATTACHMENT FOR SINGLE LENS REFLEX CAMERA

This is a continuation of application Ser. No. 98,550 filed Dec. 16, 1970 now abandoned.

The present invention relates to an interchangeable objective lens mounts having a pre-set diaphragm, especially to an interchange objective lens attachment for a single lens reflex camera having a TTL (through the-taking-lens) sensing exposure meter to sense the light through the interchange objective lens with its diaphragm fully released.

In such camera, since the amount of light passing through the lens varies depending on the F-number of the interchangable objective lens in a fully released state, it is necessary to change the exposure meter indication to compensate for the F-number of the coupled lens for a through the-fully-opened-aperture photometering. It is also necessary to adjust the exposure meter depending on a preset value of the diaphragm.

The present invention is intended to provide an interchange objective lens having a diaphragm value transmission device to achieve the above requirements.

Now the present invention shall be explained referring to the drawings.

Figure 2:
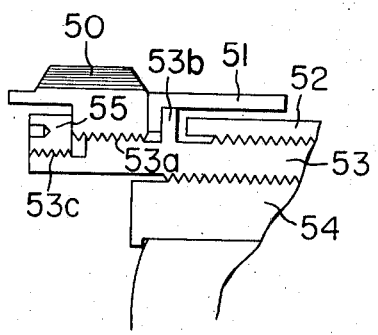
Figure 3:
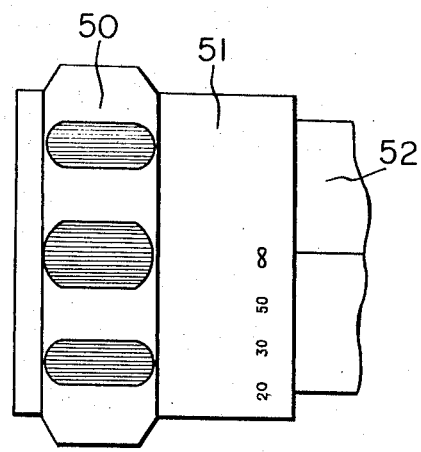
Figure 8:
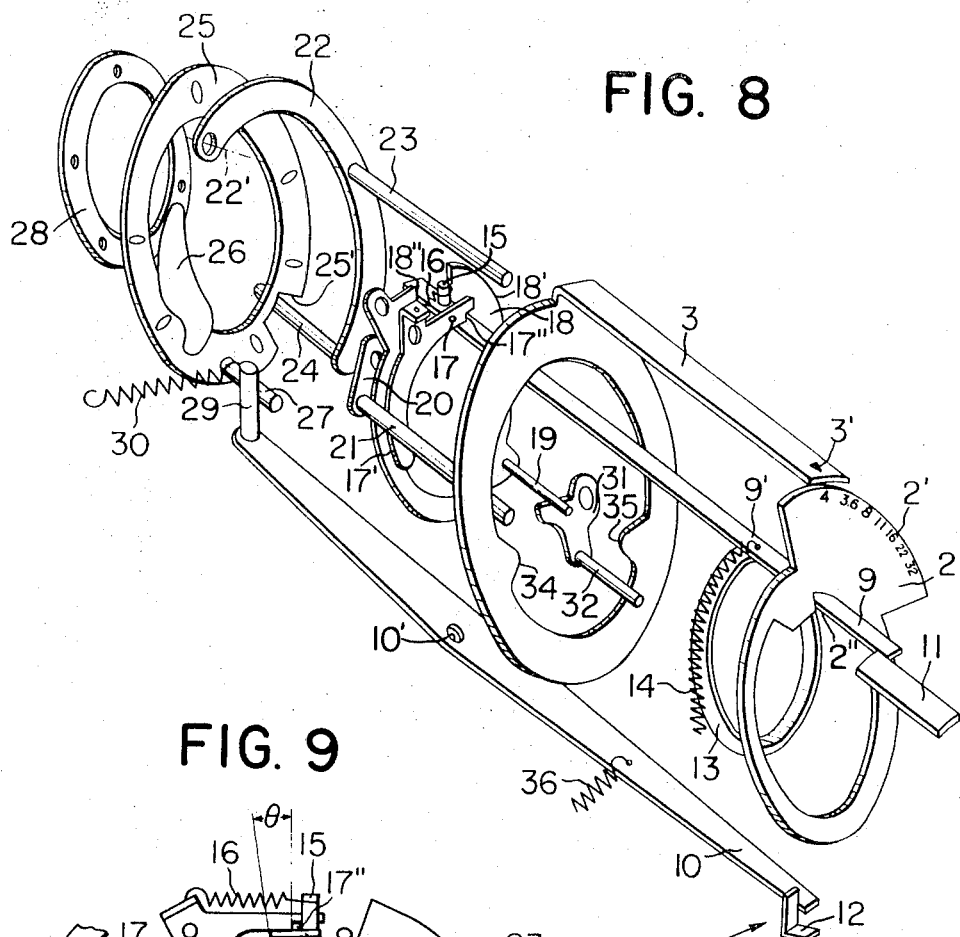
Figure 9:
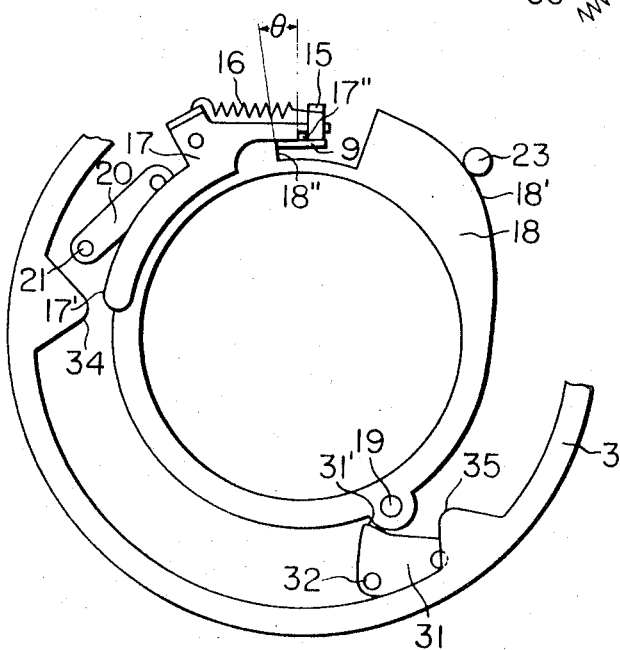
Figure 11:
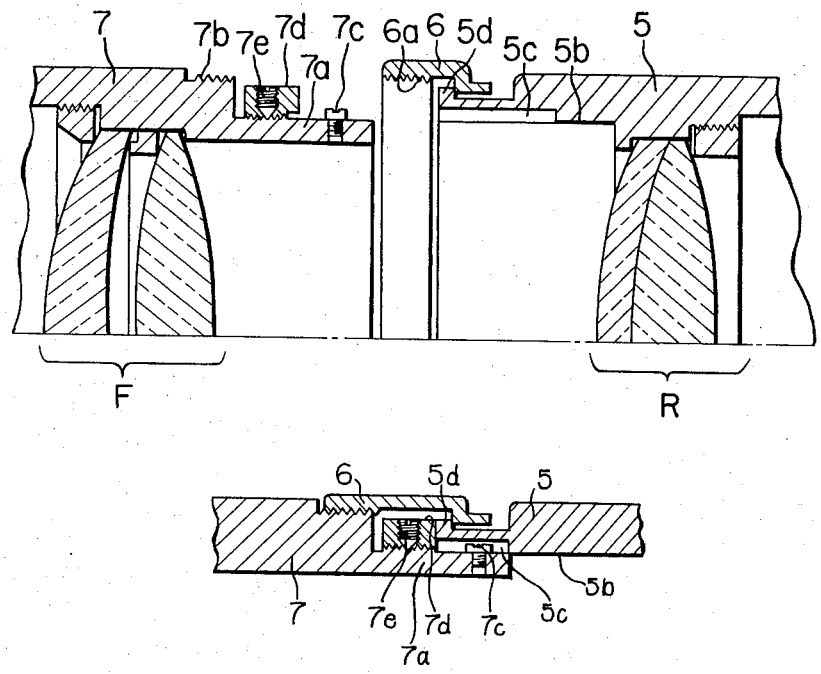
Figure 10:
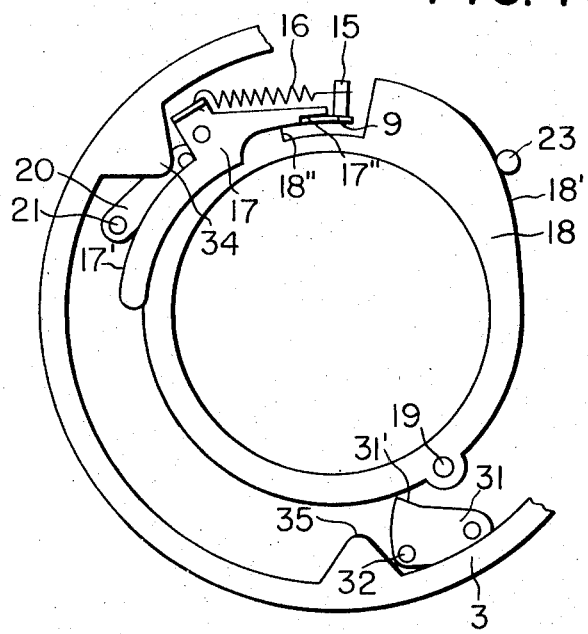

FIG. 1 is an oblique view of the diaphragm device for an interchange objective lens according to the present invention. FIG. 2 is a partial cross-sectioned view showing a manner of mounting a focusing ring or distance scale ring of an interchange objective lens according to the present invention. FIG. 3 is a plan view showing the same portion as shown in FIG. 2. FIG. 4 is an oblique view showing an arrangement of a diaphragm transmission member of the present invention. FIG. 5 is an oblique view showing another example of the present invention. FIG. 6 is a plan view showing an external appearance of still other example of the present invention. FIG. 7 is a side view from a rear side of the lens shown in FIGS. 6-A and 6-B. FIG. 8 is an oblique schematic view of the diaphragm device of the lens shown in FIG. 6. FIG. 9 and FIG. 10 show the function of the diaphragm device. FIG. 11 is a cross-sectional view showing a structure of the mounting part for a front lens group.

In FIG. 1, 1 is a mounting ring for mounting an interchangable objective lens on a camera. The ring 1 is attached to a camera in such a state that an indicating mark 1a is positioned to match a fixed point (not shown in the drawing) of the camera, and the lens is fixed to the camera by rotating the ring 1 in the direction shown by an arrow A.

A pre-set ring 2 of a diaphragm device, carries a diaphragm scale 2' on its outer circumference and an arm 2'' in its inside. A transmission member for transmitting the pre-set value of the diaphragm to an exposure meter of a camera, is fixed to a ring 13 and is supported to rotate around the optical axis and biased in a clockwise direction by a spring 14, and always engaged with an arm 2'' of the ring 2. One end of the member 9 engages a projection of a cam ring 18, while the other end of the member 9 engages a member 11 linked with an exposure meter. A diaphragm blade 26 is held in place by a diaphragm driving ring 25 and a fixed ring 28 in a conventionally known manner. A lever 22 rotates around an axle 22' on the fixed portion of the lens barrel, and a pin 23 mounted on the lever 22 engages a cam surface 18a of the cam ring 18. Another pin 24 engages a projection 25a of the diaphragm driving ring 25. The ring 25 is biased in a closing direction by a spring 30.

A diaphragm operating lever is fixed to a ring 10a and one end of the lever 10 engages a diaphragm operating lever 12 of a camera while the other end thereof engages a pin 27 mounted on an arm 25b of the diaphragm driving ring 25. The lever 10 is pulled in a clockwise direction by a spring 36 which is stronger than the spring 30, thereby retaining the ring 25 in an opened position against the spring 30.

When a camera is directed at an object and the pre-set ring 2 is rotated, the portion 9 moves to adjust the exposure meter through the linkedly operated member 11. On the other hand the cam ring 18 is rotated and the position of the stopper pin 24 on the lever 22 is determined by the cam part 18a.

As the lever 12 of the camera moves in a direction of an arrow B in a linked movement with the release of a shutter, the diaphragm operating lever 10 is rotated in a counter clockwise direction against the spring 36. The diaphragm driving ring 25 rotates following the movement of the lever 10 by a spring 30. The projection 25a comes into contact with the stopper 24 to determine the diaphragm diameter.

As the lever 12 resumes its original position after the shutter operation, the spring 36 causes the operating lever 10 to rotate the diaphragm driving ring 25 in a clockwise direction, thus charging the spring 30, so that the diaphragm is again fully opened.

For dismounting the lens mount from a camera the ring 1 is rotated in the direction opposite to that of the arrow A. At this time the arm 1b on the ring 1 is engaged with the transmission portion 9 and both members 1 and 13 are rotated together. This generates a gap between the member 9 and the linkedly operated member 11 at the end position of the rotation. Since the lever 9 is at the above position, when a lens is again mounted on the camera, there is no chance for erroneous coupling of the portion 9 with an opposite side of the linkedly operated member 11.

The lens may be mounted on a camera having an EE mechanism. Then as the pre-set ring 2 is rotated in the same direction as that of the arrow A and is set at the position of EE operation, which position is provided beyond the range of diaphragm values on the circumferential surface of the ring 2, the cam 2a on the ring 2 pushes a pin 38. The latter is supported by a fixing member not shown. An end of the pin contacts and slides on the side surface of the ring 2, against a spring which is not shown in the drawing, and in the direction of an arrow C. This activates a change over lever 39 provided on a camera, thus setting the EE mechanism at its preparatory state.

Next, as the EE mechanism is activated by shutter release and the diaphragm value is determined on the camera side, the linkedly moving member 11 shifts the transmission member 9 against the spring 14, rotating the cam ring 18, and the position of the stopper 24 is set through the lever 22.

As mentioned previously, the operating lever 12 rotates the diaphragm driving ring 25 to determine the diaphragm aperture.

When such a lens is mounted on a camera or bellows without linking members such as the operating lever 12, the diaphragm needs to be operated by hand. In this case, before the lens is mounted to a camera or bellows, the diaphragm operating lever 10 is rotated considerably in the direction of the arrow B beyond the working range of diaphragm, and a pin 10b mounted on the lever 10 is clamped by a clamp spring 40 provided on the fixed part of a lens barrel (not shown). Thereby, the diaphragm driving ring 25 is released from the locking by the operating lever 10, and thus rotates following the rotation of the pre-set ring 2. Thus the diaphragm can be freely adjusted manually.

A spring 37 biases the pre-set ring 2 in a clockwise direction, and the ring 2 is held at a setting position by a click stop portion against the spring 37. Reference character 2b shows grooves of the click stop portion.

The diaphragm value transmission member 9, as shown in FIG. 7, is arranged so that it takes the same position with respect to a camera at a given diaphragm value regardless of the full-open F-number of an interchangable lens.

According to the above-arrangement when an interchangeable lens having a full-open F-number one step brighter or darker is used as a replacement, the amount of light reaching a sensing element will be, if the lens is brighter, two times of that of a darker lens. Thus the diaphragm is to be stopped down one step more, and as a result the same diaphragm value can be obtained. Therefore, necessary compensation for the difference in the full-open F-number can be provided automatically without providing a special compensation device.

FIG. 2 and FIG. 3 show a method of mounting a shooting distance ring on the above mentioned lens.

In the drawings, 52 is a fixed portion of a lens barrel having screws at its inner circumference, 53 is a helicoid which is is threaded engagement with the fixed portion 52, and 54 is a lens holder which is in threaded engagement with the inside of the helicoid 53. Reference character 50 represents a focus adjusting ring, and 51 represents a shooting distance ring.

In the front portion of the helicoid 53, a screwed part 53a is provided and the adjusting ring 50 is screwed therewith. The distance scale or focusing ring 51 is then inserted between the ring 50 and a flange 53b provided at the rear portion of the screwed part 53a.

A screwed part 53c is provided also on the helicoid 53 and a lock nut 55 is screwed therewith so that the focus adjusting ring 50 and the distance scale ring 51 are firmly fixed after the lens is adjusted.

FIG. 5 shows an example wherein further another lever 23b is provided between the cam ring 18 and the lever 22 for the purpose of enhancing the diaphragm accuracy. By rotation of the pre-set ring 2 the cam ring 18 is rotated and the lever 23b having the pin 23a which engages with the cam part 18a is rotated around an axle 23c. The lever 22 which engages with a pin 23d on the lever 23b is rotated around an axle 22' and a stopper pin 24 on the lever 22 is set at a position corresponding to a pre-set diaphragm value.

Since the lever ratio can be suitably determined by the above mentioned arrangement, it is possible to make the lift of the cam 18a large. Thus, the diaphragm accuracy can be enhanced.

FIG. 6 to FIG. 10 show an example in an interchange lens mount of the lens barrel type, wherein a common focus adjusting device and a diaphragm mechanism are provided and only the front lens group is exchanged.

In FIG. 6, 3 is a change-over ring, 5 is a focus adjusting ring, 6 is a front lens clamping ring, 7 is a lens of focus distance of A-mm, and 8 is a lens of focus distance of B-mm, wherein the numbers same as in the example shown in FIG. 1 denote the same parts or members having same functions.

In this example also, the diaphragm value transmission member 9 is, as in the example in FIG. 1, arranged so that it starts from the same position regardless of the full-open F-number of the lens. FIG. 7 shows its state.

When the lens A is mounted, after the lens 7 is fixed to the lens barrel by a clamping ring 6 and the pre-set ring 2 is set at a full-open position, the indication mark 3' of the change over ring 3 is matched to the full-open F-number of the lens A.

As shown in FIG. 8, the transmission member 9 is fixed to the ring 13 at 9' and can be rotated around the optical axis. It is pressed against an arm 2" of the pre-set ring 2 by a spring 14. One end of the member 9 engages with the linking member 11 for an exposure meter and the other end thereof engages with a notched part 18" by a spring 16 provided between a cam ring 18 and the member 9.

As the pre-set ring 2 is rotated, the cam ring 18 is rotated by the transmission member 9, and an arched lever 22 is rotated around an axle 22' by a pin 23 which engages a cam 18' on the circumference of the ring 18. A stopper pin 24 is then shifted. On the other hand the member 11 linked with an exposure meter of a camera adjust the indication of an exposure meter depending on the diaphragm value.

When the rotation of the ring 2 is stopped as the exposure meter is adjusted to a proper exposure value, the stopper pin 24 is set to correspond to a pre-set diaphragm value. An explanation follows concerning the effect of the lens A being dismounted from the lens barrel and the lens B mounted. The explanation is based on the assumption that the full-open F-number of the lens A is one step smaller in F-number than that of lens B.

In FIG. 6 while the pre-set ring 2 is rotated to a full-open, position, the indication mark 3" of the change over ring 3 is set at the full-open F-number scale readings of the lens B. At this time F-number scale readings which are brighter than that of the scale 2" will be concealed by the portion 4.

The change over ring 3 has in its inner circumference a cam 34 and a cam 35, and as it is rotated in a clockwise direction. The cam 35 pushes the pin 32 and the bell crank 31 is rotated in a counterclockwise direction. Then the pin 19 planted on the cam ring 18 is pushed so that the cam ring 18 is rotated in a counterclockwise direction.

At this time the diaphragm value transmission member 9 engages the pre-set ring 2 and is stopped. Thus when the cam ring 18 is rotated beyond the angle $\theta$ shown in FIG. 9, the stepped part 17" of a locking lever 17 pivotably provided on the cam ring 18 is rotated by a spring 16 and drops in. Then after the cam 35 passes the pin 32, the stepped part 17" engages the member 9. Thus the state shown in FIG. 10 is reached, and the position of the cam ring 18 is determined. That is, the cam ring 18 is set at a position more advanced by $\theta$ than the member 9, thus compensating for the difference in the full-open F-number.

The operations after that will be same as in the case of the lens A.

As the change over ring 3 is rotated in a counterclockwise direction, the cam 34 pushes a locking lever 17 through a pin 21 on the lever 20, rotating the locking lever 17 in a counterclockwise direction, and releasing the engagement between the transmission member 9 and the stepped part 17''. Thus, the cam plate 18 is rotated in a clockwise direction by the spring 16 until the notched part 18'' engages the member 9, thereby resuming its original position.

The cams 34, 35 of the change over ring 3 are arranged so that the cam 34 works first when the ring 3 is rotated in a clockwise direction, while the cam 35 works first when the ring 3 is rotated in a counterclockwise direction.

In general, when a distance adjusting device is used with lenses having different focal lengths, the distance scale needs to be interchanged. But in this example of the present invention as shown in FIG. 6, distance scale readings are marked in a tandem arrangement parallel to the optical axis on the change over ring 3 and thus rotatable just the same as the diaphragm indicator marks 3', 3'' of the change over ring 3. Thus the shooting distance range is indicated by the rear end edge 5' of the distance adjusting ring 5 as the ring 5 moves back and forth. Thus it is not necessary to replace the distance scale each time the front lens group is interchanged, and the distance scale can be brought to the most easy-to-look position, for example, on the very top of the lens barrel by rotation of the change over ring 3.

FIG. 4 shows an example wherein the diaphragm operating lever 10 is arranged so that it can be rotated around an axial line X — X for the purpose of its smooth rotation. A fixed part 4 of the lens barrel receives an axle 42 which is fixed in a vertical position. A ring 10a fixed to the lever 10 is fitted with the axle 42 which passes through the lever 10, and is rotated around the axle 42 by the operating lever 12 provided on the camera side. In this case, the spring 36 is provided almost parallel with the optical axis.

FIG. 11 shows a mounting device for the front lens group. A front lens frame 7 has a fit-in part 7a, a screwed part 7b, a pin 7c and a stopper 7d, while a part 5b to receive the fit-in part 7a and key groove 5c are provided at a lens barrel 5.

A clamping ring 6 is fitted around the lens barrel 5 in a rotatable manner, and is prevented from being displaced forwardly by a flanged part 5d of the lens barrel 5.

The pin 7c is placed in the key groove 5c and the fit-in part 7a is fitted into the part 5b, while a screw part 6a of the clamping ring 6 is screwed with the screwed part 7b to rotate the ring 6 for clamping. Thus, the distance between the front lens group F and the rear lens group R is determined by the position where the rear end of the stopper 7d contacts the front end of the flanged part 5d.

The stopper 7d is made with a ring shape and is, as shown in the drawing, attached to the lens frame 7 by the thread provided in the inner circumference of the stopper itself. Thus it can be set at a suitable position by a small screw 7e. Therefore the arrangement is convenient for adjusting the distance between the lens groups beforehand.

While embodiments of the invention have been described in detail, it will be obvious to those skilled in the art that the invention may be embodied otherwise without departing from its spirit and scope.

What is claimed is:

1. An interchangeable lens attachment for use with a single lens reflex camera having a shutter and exposure measuring means as well as for use with a single lens reflex camera having a shutter and an electric exposure control, comprising mounting means for mounting the attachment to a camera, diaphragm means movable from an open position through intermediate positions to a closed position, biasing means connected to said diaphragm means for biasing the diaphragm means towards its closed position, shutter responsive means coupleable to the shutter of a camera for holding said diaphragm means in the open position and releasing said diaphragm means for movement through intermediate positions toward the closed position in response to operation of the shutter, diaphragm stopping means movable into various positions in the path of the movement of said diaphragm means to stop the movement of said diaphragm means in a given position after said diaphragm means has been released to move toward the closed position, and setting means coupled to said stopping means for imparting the movement of said stopping means to the exposure measuring means when the attachment is mounted on a camera having exposure measuring means and for receiving movement from the exposure control means when the attachment is mounted on a camera having exposure control means.

2. An attachment as in claim 1, wherein said stopping means includes a movable control lever engageable with said diaphragm means, and a cam ring responsive to said setting means for establishing the position of said lever.

3. An attachment as in claim 2, wherein said setting means includes a transmission member engaging said cam ring, second biasing means for moving said transmission member in one rotational direction, a manually movable diaphragm setting ring, and third biasing means for urging said setting ring to move toward said transmission member, said setting ring having a second member engageable with said transmission member so as to allow movement of said transmission member by said setting ring in a direction opposite to the urging of said second biasing means.

4. An attachment as in claim 2, further comprising an attachment for mounting a front lens group with varying focal lengths and F-numbers.

5. An attachment as in claim 4, further comprising a ring with an automatic-manual switchover for changing the relationship between said cam ring and said control level to compensate for differences in maximum aperture and a lever axially supported on said cam ring for maintaining the change in relationship.

6. An attachment as in claim 5, wherein the switchover ring includes a plurality of diaphragm indication marks.

7. An interchangeable lens attachment for use with a single lens reflex camera having a shutter and exposure measuring means as well as for use with a single lens reflex camera having a shutter and an electric exposure control, comprising mounting means for mounting the attachment to a camera, a diaphragm, a diaphragm blade control ring, biasing means connected to said control ring for biasing the ring in a direction for closing the diaphragm, an operating lever connectable to a shutter and to said control ring for holding the diaphragm control ring open and for releasing the ring toward the closed position in response to operation of the shutter, variable stopping means for stopping the rotation of the control ring at a given position after the control ring is released by the shutter, a cam ring coupled to said stopping means for controlling the position that said stopping means stops said diaphragm control ring, a diaphragm presetting ring for manually setting a position at which the diaphragm should be stopped after the shutter is released, and a diaphragm value transmission member engageable with said diaphragm presetting ring for imparting the position of said diaphragm presetting ring to said cam ring when the attachment is mounted in a camera having exposure measuring means and engageable with an electric exposure control in the camera for imparting the position of the automatic exposure control to said cam ring rather than the position of said diaphragm presetting ring when the attachment is mounted on a camera having exposure measuring means.

8. For a single lens reflex camera having a shutter and light responsive means, an interchangeable lens, comprising diaphragm means capable of adjustment from a fully open position to a fully closed position, biasing means coupled to said diaphragm means for moving said diaphragm means along a path through a plurality of positions from its fully open position toward its fully closed position, release means responsive to the shutter for holding said diaphragm means in the fully open position and releasing said diaphragm means to allow said biasing means to move it toward the fully closed position, a diaphragm setting member, a diaphragm control member capable of coacting with said setting member, stop means coupled to said control member and engageable with said diaphragm means for being displace by said control member to positions along the track of movement of said diaphragm means so as to stop said diaphragm means at one of the positions established by said control member in cooperation with said setting member, a transmission member connected with said control member for operating the control member in response to the light responsive means of the camera, and second biasing means engaging said transmission member for biasing said transmission member against said setting member for adjusting said control member, but said biasing means permitting separate adjustment of said control member, independent of said setting member, by said transmission member.

9. An interchangeable lens as in claim 8, wherein said stop means includes a movable control lever engageable with said diaphragm means, and a cam ring responsive to said setting member for establishing the position of said lever.

10. An interchangeable lens as in claim 9, further comprising a switching ring to change the relationship between said cam ring and said control lever to compensate for differences in maximum aperture.

11. An interchangeable lens, as in claim 10, wherein the switching ring includes a plurality of diaphragm indication marks.

12. An interchangeable lens attachment for use with a single lens reflex camera having a shutter and exposure measuring means as well as for use with a single lens reflex camera having a shutter and an electric exposure control, comprising mounting means for mounting the attachment to a camera, shutter responsive diaphragm means supported by said mounting means and coupleable to the shutter of a camera to which the attachment is mounted for normally remaining in an open position and for moving through intermediate positions toward a given closed position in response to operation of the shutter, and setting means coupled to said diaphragm means for defining the given closed position, a manually operable diaphragm control, characterized in said setting means being operated by said control and engaging said exposure measuring means for imparting the position of said setting means to said exposure measuring means when the attachment is mounted on a camera having exposure measuring means, and in said setting means being disengageable from said manual control and engaging said electric exposure control for receiving positioning information from said electric exposure control when said mounting means mounts the attachment upon a camera having an electric exposure control.

13. An interchangeable lens attachment having a diaphragm preset device, which lens attachment is attachable to a camera having an electric exposure control and a camera having an exposure measuring means, comprising mounting means for mounting the attachment on a camera, a preset ring supported by said mounting means for preselecting a diaphragm value and movable to a plurality of diaphragm adjusting positions and a predetermined automatic actuating position beyond the diaphragm adjusting positions, diaphragm means movable from an open position through a plurality of intermediate positions to a closing position, biasing means for biasing the diaphragm means into the closing position, shutter responsive means connectible to a camera shutter for holding the diaphragm means at an open position and releasing it so as to move the diaphragm means to the closed position in response to the shutter operation, stop means movable to a plurality of positions in the path of the diaphragm means for stopping the movement of the diaphragm means at a preset position after the diaphragm means has been released toward the closed position, a transmission member engaging said stop means at one end, a spring biasing said transmission member into engagement with the preset ring to control the stop means when the ring is on the diaphragm scale range and said transmission member engaging said exposure measuring means when said mounting means mounts the attachment onto a camera having exposure measuring means so as to impart the position of the ring to said measuring means, said transmission member being disengaged from said ring when the ring is moved from the scale range and engaging an electric exposure control when the mounting means mounts the attachment onto a camera having an electric exposure control for imparting the adjustment of said electric exposure control to said stop means.

14. An attachment as in claim 13, further comprising an attachment for mounting a front lens group with varying focal lengths and aperture ratios, and a switching ring for switching the relationship of said stop means with the transmission member to compensate for differences in maximum aperture, and a locking lever for for maintaining the change in relationship and the transmission member.

* * * * *